(12) United States Patent
Pance et al.

(10) Patent No.: US 8,560,309 B2
(45) Date of Patent: Oct. 15, 2013

(54) REMOTE CONFERENCING CENTER

(75) Inventors: Aleksandar Pance, Saratoga, CA (US);
Nicholas Vincent King, San Jose, CA (US)

(73) Assignee: Apple Inc., Cupertino, CA (US)

( * ) Notice: Subject to any disclaimer, the term of this patent is extended or adjusted under 35 U.S.C. 154(b) by 694 days.

(21) Appl. No.: 12/649,025

(22) Filed: Dec. 29, 2009

(65) Prior Publication Data
US 2011/0161074 A1     Jun. 30, 2011

(51) Int. Cl.
*G10L 15/00*     (2013.01)

(52) U.S. Cl.
USPC ......................................................... 704/231

(58) Field of Classification Search
USPC ......................................................... 704/231
See application file for complete search history.

(56) References Cited

U.S. PATENT DOCUMENTS

| | | | |
|---|---|---|---|
| 4,081,631 A | 3/1978 | Feder | |
| 4,658,425 A | 4/1987 | Julstrom | |
| 5,335,011 A | 8/1994 | Addeo et al. | |
| 5,570,324 A | 10/1996 | Geil | |
| 5,619,583 A | 4/1997 | Page et al. | |
| 6,073,033 A | 6/2000 | Campo | |
| 6,129,582 A | 10/2000 | Wilhite et al. | |
| 6,151,401 A | 11/2000 | Annaratone | |
| 6,154,551 A | 11/2000 | Frenkel | |
| 6,192,253 B1 | 2/2001 | Charlier et al. | |
| 6,317,237 B1 | 11/2001 | Nakao et al. | |
| 6,469,732 B1 * | 10/2002 | Chang et al. | 348/14.08 |
| 6,813,218 B1 | 11/2004 | Antonelli et al. | |
| 6,829,018 B2 | 12/2004 | Lin et al. | |
| 6,882,335 B2 | 4/2005 | Saarinen | |
| 6,934,394 B1 | 8/2005 | Anderson | |
| 7,003,099 B1 | 2/2006 | Zhang et al. | |
| 7,082,322 B2 | 7/2006 | Harano | |
| 7,154,526 B2 | 12/2006 | Foote et al. | |
| 7,158,647 B2 | 1/2007 | Azima et al. | |
| 7,194,186 B1 * | 3/2007 | Strub et al. | 386/241 |
| 7,263,373 B2 | 8/2007 | Mattisson | |

(Continued)

FOREIGN PATENT DOCUMENTS

| | | |
|---|---|---|
| EP | 2094032 | 8/2009 |
| GB | 2310559 | 8/1997 |

(Continued)

OTHER PUBLICATIONS

Baechtle et al., "Adjustable Audio Indicator," IBM, 2 pages, Jul. 1, 1984.

(Continued)

*Primary Examiner* — Jakieda Jackson
(74) *Attorney, Agent, or Firm* — Morgan, Lewis & Bockius LLP (57) ABSTRACT

Certain embodiments disclosed herein relate to systems and methods for recording audio and video. In particular, in one embodiment, a method of recording audio signals is provided. The method includes recording audio signals with a plurality of distributed audio transducers to create multiple recordings of the audio signals and providing each of the multiple recordings of the audio signals to a computing device. The computing device combines each of the multiple recordings into a master recording and determines a source for each audio signal in the master recording. Additionally, the computing device stores each audio signal in separate audio files according to the determined source of each audio signal.

20 Claims, 6 Drawing Sheets

(56) References Cited

U.S. PATENT DOCUMENTS

| | | | |
|---|---|---|---|
| 7,266,189 B1 | 9/2007 | Day | |
| 7,378,963 B1 | 5/2008 | Begault et al. | |
| 7,536,029 B2 | 5/2009 | Choi et al. | |
| 8,135,115 B1* | 3/2012 | Hogg et al. | 379/88.22 |
| 2003/0171936 A1* | 9/2003 | Sall et al. | 704/500 |
| 2003/0236663 A1* | 12/2003 | Dimitrova et al. | 704/245 |
| 2004/0013252 A1* | 1/2004 | Craner | 379/142.01 |
| 2004/0203520 A1 | 10/2004 | Schirtzinger et al. | |
| 2004/0263636 A1* | 12/2004 | Cutler et al. | 348/211.12 |
| 2005/0182627 A1* | 8/2005 | Tanaka et al. | 704/248 |
| 2005/0209848 A1* | 9/2005 | Ishii | 704/231 |
| 2005/0271216 A1 | 12/2005 | Lashkari | |
| 2006/0072248 A1 | 4/2006 | Watanabe et al. | |
| 2007/0188901 A1* | 8/2007 | Heckerman et al. | 360/23 |
| 2008/0204379 A1 | 8/2008 | Perez-Noguera | |
| 2008/0292112 A1 | 11/2008 | Valenzuela et al. | |
| 2009/0018828 A1* | 1/2009 | Nakadai et al. | 704/234 |
| 2009/0070102 A1* | 3/2009 | Maegawa | 704/9 |
| 2009/0094029 A1* | 4/2009 | Koch et al. | 704/246 |
| 2009/0247237 A1 | 10/2009 | Mittleman et al. | |
| 2009/0274315 A1 | 11/2009 | Carnes et al. | |
| 2009/0304198 A1* | 12/2009 | Herre et al. | 381/66 |
| 2009/0316943 A1 | 12/2009 | Munoz et al. | |
| 2010/0103776 A1 | 4/2010 | Chan | |
| 2011/0002487 A1 | 1/2011 | Panther et al. | |
| 2011/0033064 A1 | 2/2011 | Johnson et al. | |
| 2011/0038489 A1* | 2/2011 | Visser et al. | 381/92 |
| 2011/0087491 A1* | 4/2011 | Wittenstein et al. | 704/235 |
| 2011/0274303 A1 | 11/2011 | Filson et al. | |
| 2012/0082317 A1 | 4/2012 | Pance et al. | |
| 2012/0330660 A1* | 12/2012 | Jaiswal | 704/235 |

FOREIGN PATENT DOCUMENTS

| | | |
|---|---|---|
| GB | 2342802 | 4/2000 |
| JP | 2102905 | 4/1990 |
| WO | WO03/049494 | 6/2003 |
| WO | WO2004/025938 | 3/2004 |
| WO | WO2007/083894 | 7/2007 |
| WO | WO2008/153639 | 12/2008 |
| WO | WO2009/017280 | 2/2009 |
| WO | WO2011/057346 | 5/2011 |

OTHER PUBLICATIONS

Pingali et al., "Audio-Visual Tracking for Natural Interactivity," Bell Laboratories, Lucent Technologies, pp. 373-382, Oct. 1999.

* cited by examiner

REMOTE CONFERENCING CENTER

TECHNICAL FIELD

The present invention relates generally to audio and/or video recording and, more specifically, to determining sources of audio signals for audio and/or video recordings.

BACKGROUND

Audio and video recordings are some of the most reliable ways of preserving contents of a conversation, lecture or discussion. However, frequently, even with the benefit of video, it may be difficult to determine the source of a particular statement or question. The difficulty of identification is increased for people who were not present or involved in the conversation, lecture or discussion, when viewing or listening to the recording. Even for those who were involved in the discussion, the passage of time generally dims the memory to make discerning such information difficult.

Generally, devices for generating recordings and/or transcripts include a consolidated device that may have multiple speakers and microphones. However, in larger environments, speakers who are too far removed from the consolidated device do are not detected or not detected to a discernible degree, resulting in an unintelligible recording.

Additionally, the recordings are typically stored as a single indexed file, making searching for content from a particular source (e.g., participant such as a lecturer or student) difficult.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any embodiment disclosed and/or claimed herein may encompass a variety of aspects that may not be set forth below.

In one embodiment, a method of recording audio signals is disclosed. The method includes recording audio signals with a plurality of distributed audio transducers to create multiple recordings of the audio signals and providing each of the multiple recordings of the audio signals to a computing device. The computing device combines each of the multiple recordings into a master recording and determines a source for each audio signal in the master recording. Additionally, each audio signal is stored in a separate audio file according to the determined source of each audio signal.

In another embodiment, a method of managing audio signals from multiple sources is disclosed. The method includes determining an identity for a plurality of unique sources of recorded audio signals and sorting the recorded audio signals according to the determined identities. Additionally, the audio signals are stored in separate audio files according to the sorting.

In yet another embodiment, an audio recording system is disclosed. The audio recording system includes plurality of distributed sound transducers and one or more processors coupled to the plurality of sound transducers. A storage device is coupled to the one or more processors. The one or more processors is configured to determine a source for received audio signals, aggregate received audio signals according to the determined source, and store the aggregated audio signals as separate audio files in the storage device according to the determined source.

These and other advantages, aspects and features of the present disclosure will become apparent to those of ordinary skill in the art upon reading this disclosure in its entirety.

DETAILED DESCRIPTION

Certain aspects of the present disclosure relate to systems and methods for generating audio and video recordings that are separated and stored in separate audio files according to the source of the audio signal. That is, the source of audio is identified and used for sorting and separately storing audio recordings. The identity of the source may include a name and/or an indication of the source's location relative to the recording system.

For determining an identity of a source, one or more techniques may be implemented. In some embodiments, voice recognition techniques may be used. In other embodiments, an amplitude of a sound signal may be used. In particular, where multiple audio transducers are deployed, an audio transducer or transducers generating a highest amplitude signal may be used to locate an origin of sound. As used herein, the term "origin" may refer to a position/location from which sound originates. The origin of the sound may be used to determine the source when, for example, the location of various sources relative to the audio transducers is known. As used herein, the term "source" may refer to an individual that is speaking or other entity or object that is producing sound. Additionally, in some embodiments, a phase difference in audio signals may be used to determine the source of an sound. Specifically, when the location of sources is known relative to distributed audio transducers, the phase difference between the audio signals received at the different audio transducers may be used to triangulate the origin of sound and, thereby, determine the source of the sound. It should be appreciated that other techniques may also be implemented to determine source identity for audio signals.

In some embodiments, collaborative systems and methods may generate a master audio file and/or determine sources of recorded audio signals. In some embodiments, the audio recordings are separated and stored according to the determined source of the audio.

Figure 1:
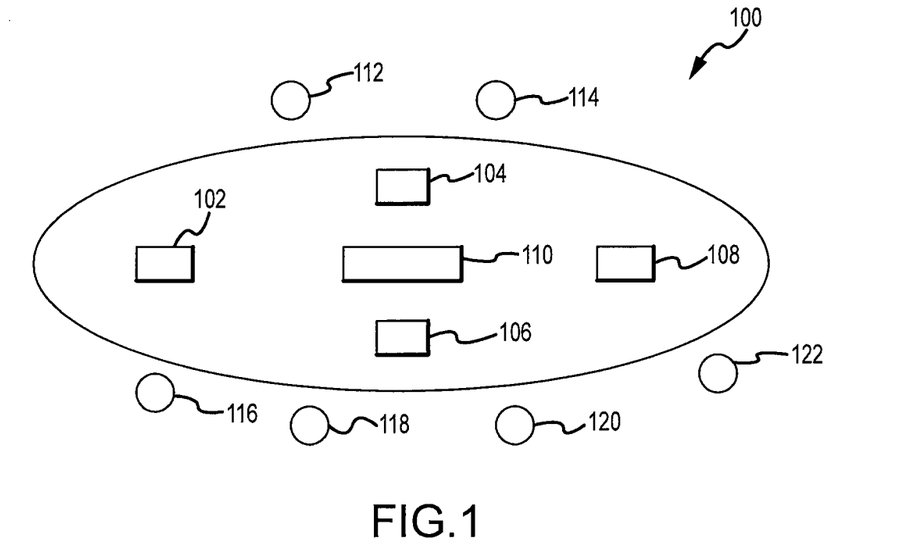
FIG. 1 illustrates an example teleconference environment with devices for recording audio of the teleconference and determining source identities for the audio.

FIG. 1 illustrates an example teleconference environment 100. The environment 100 includes distributed sound transducers 102, 104, 106, 108 and a computing device 110. In some embodiments, the distributed sound transducers 102, 104, 106, 108 may include one or more microphones and/or one or more speakers. Additionally, in some embodiments, the distributed sound transducers 102, 104, 106, 108 may be included within a single housing. Additionally, in some embodiments, the computing device 110 is integrated within the same housing as one or more of the transducers 102, 104, 106, 108.

In some embodiments, the computing device 110 may be remote. That is, the computer device 110 may be physically located remotely from the environment shown in FIG. 1. In such embodiments, the computing device 110 may be in communication with the devices in the environment via a peer-to-peer or network connection.

Additionally, it should be appreciated that more or fewer sound transducers may be implemented. For example, in some embodiments, three audio transducers may be implemented. Furthermore, in some embodiments, the computer device 110 may include three or more audio transducers that are arrange within the housing of the computer device 110 such that they may be used to determine the origin of the sound relative to computer device 110. That is, the three or more transducers in the computer device 110 may be used to determine the origin of the sound.

FIG. 1 also illustrates individuals 112, 114, 116, 118, 120, 122 located at various positions relative to the sound transducers 102, 014, 106, 108. Each of the individuals 112, 114, 116, 118, 120, 122 may be a source of sound. In some embodiments, approximate positions of the individuals 112, 114, 116, 118, 120, 122 are known, so that the computing device 110 may identify the source of sounds based on the origin of the sound. For example, the amplitude of the audio signals and/or the time the audio signals arrive at the respective sound transducers 102, 104, 106, 108, may be used to determine the origin of the sound and, hence, the identity of the source. For example, with the approximate locations of the individuals 112, 114, 116, 118, 120, 122 being known, it may be determined when one is speaking. In particular, if individual 112 speaks, the amplitude of the signal received at sound transducers 102, 104 may be greater than the amplitude of the signal received at sound transducers 106, 108. Additionally, the sound signal received at sound transducers 102, 104 is received earlier in time relative to when it arrives are sound transducers 106, 108.

In some embodiments, a voice recognition system may be implemented to determine a source of sound. For example, the individuals 112, 114, 116, 118, 120, 122 may provide a voice sample that may be analyzed by the computing device 110 and used for comparison purposes when audio signals are received by the computer device 110. In these embodiments, if a sound signal received at the computer device 110 does not match or correspond to characteristics of any prerecorded samples from the individuals 112, 114, 116, 118, 120, 122, the computer device 110 may store the unidentified sound signal as a new sample and compare future received audio signals against it. As such, the unidentified sound signal may serve as a sample for future reference in identifying audio signals as being from a common source as the unidentified sound signal.

In the embodiment shown in FIG. 1, each of the transducers 102, 104, 106, 108 may have a generally fixed location. As illustrated, the sound transducers 102, 104, 106, 108 may each be located on a table-top 130. Additionally, the distribution of the sound transducers 102, 104, 106, 108 may be symmetrical or evenly separated.

The sound transducers 102, 104, 106, 108 are communicatively coupled to the computing device 110 either, wirelessly or via a wired connection. In some embodiments, the communications may be via a peer-to-peer connection or via a network connection. For example, in some embodiments, the sound transducers may communicate with the computer device 110 via infrared connection, Ethernet connection, a local area network (LAN), a wide area network (WAN), an internet connection, and so forth. In one example, radio frequency (RF) signals may be used in accordance with an RF communication protocol such as Bluetooth®. In other embodiments, a network connection may be via an Ethernet cable, a wireless connection (e.g., WiFi), or a combination of the two, for example.

Figure 2:
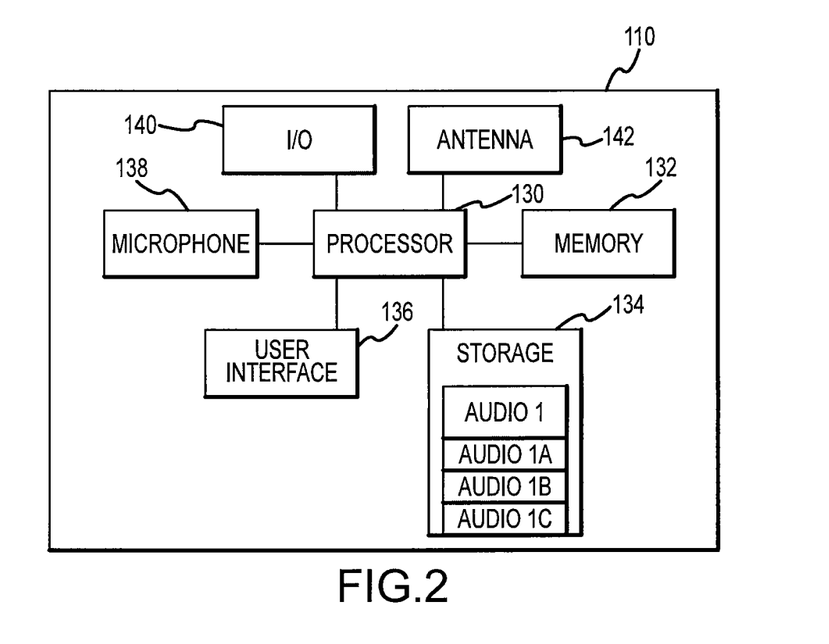
FIG. 2 illustrates an example computing device for use in determining the identity of the meeting participants.

FIG. 2 illustrates a block diagram of the computing device 110. The computing device 110 includes a processor 130, and a memory 132 and a storage 134 coupled to the processor 130. The memory 132 may be implemented as any suitable technology, including random access memory (RAM), static (RAM), dynamic RAM, and the like. The memory may function as execution memory, holding data and applications that are accessed for execution or for processing by the processor 130. It should be appreciated that one or more of the audio transducers 102, 104, 106 and 108 may include similar components and may be configured to provide similar functionality as the computer device 110.

The storage 134 may be implemented in any suitable storage technology such as hard disk drives, solid state drives, tape drives, and so forth. In some embodiments, one or more storage technologies may be implemented. The storage 134 may store software, applications and data for use on the computing device 110 including an operating system, voice recognition software, and/or audio processing software. Additionally, the storage 134 may store any recorded audio signals from the various sound transducers 102, 104, 106, 108. In some embodiments, the audio signals may initially be stored as raw data files received from the sound transducers. As such, there may be multiple different recordings stored in storage 134 for a single conference or conversation.

The computing device 110 may also include a user interface 136, sound transducers 138, one or more I/O ports 140, and one or more antennas 142. The sound transducers 138 may be distributed within the computing device 110 so that it may be used independently from the other sound transducers 102, 104, 106, 108 and determine the origin and source of audio signals. For example, the distributed transducers 138 may be used to triangulate an origin of audio signals and then determine the source of the audio signals in accordance with techniques discussed herein.

The antenna 142 may facilitate data transmission via standard communication protocols and/or frequencies such as Bluetooth®, WiFi, infrared, radio frequency and so on. The antenna 142 may be used to communicate wirelessly with the sound transducers 102, 104, 106, 108, and/or to communicate with other computing devices and or network devices, such as a network switch, for example. In some embodiments, an infrared (IR) emitter and detector may be provided for communication purposes and may operate in accordance with an IR communication protocol. The IR communications may replace or function with the antenna 142. For the purposes of this disclosure, references to antenna communications or antennas cover IR emitter and detector embodiments.

In a teleconference or video conference environment, the antenna 142 may be used to communicate over a network connection with another computer device (not shown) located with other participants in the teleconference or video conference. The other computing system may perform similar tasks to the computing device 110 and the two systems may communicate or otherwise transfer or share information such as recorded audio and identifying information for sources of the recorded audio. In other embodiments, the computing device 110 is the only computing system used to determine source identifying information.

In some embodiments, a 60 GHz antenna may be provided and used to scan the environment of the computing device 110 and/or the audio transducers to determine locations of various participants in a conference. The 60 GHz antenna operates similar to radar. The 60 GHz antenna typically emits a narrowband signal that is reflected back from objects. The reflections may be detected and may be used to determine the contours of the objects that reflect the signals. From these contours, objects and individuals in the teleconference or video conference environment may be mapped and this information may be used to determine the origin and sources of audio signals. In some embodiments, the 60 GHz antenna may be used in conjunction with other identifying information, such as a spectral distribution of a participant's voice to determine who is speaking and/or the location of a speaker.

The I/O ports 140 may also be used for communication purposes, in some embodiments. For example, the I/O ports may provide for external communication devices to interface the computing device 110, such as an external antenna for WiFi. Additionally, the I/O ports may be used for memory cards, readable media, user input devices, and the like. The sound transducer 138 may be a microphone and/or a speaker. The user interface 136 may include a display, a keyboard, a mouse, and the like, to allow the computing device 110 to provide output and a user to provide input. Each of the various components of the computer device 110 may be used in some way in conjunction with recording, processing, storing, and/or playback of the audio signals. It should be appreciated, however, that in other embodiments, the computing device 110 may include more or fewer component parts and may perform other functions besides audio recording, processing, and playback. Indeed, in some embodiments, the computing device 110 may include hardware and/or software for video playback, for example.

As discussed above, the computing device 110 may be used for both video and audio recording. To facilitate video playback and recording the computing device 110 may include a camera and a display. In some embodiments, the camera may be capable of still and video images. In one embodiment, upon determining the location of an origin of an audio signal, the camera may automatically articulate to be directed towards that location so that the participant currently speaking may be displayed. In some embodiments, the camera may zoom in on the participant. In other embodiments, multiple cameras may be used. For example, a camera may be trained on each participant or group of participants. While the participant is displayed in a video conference, for example, a user may select the image or name of the participant to obtain additional information about the participant. Information such as title, education and experience may be available as well as contact information, for example.

Figure 3:
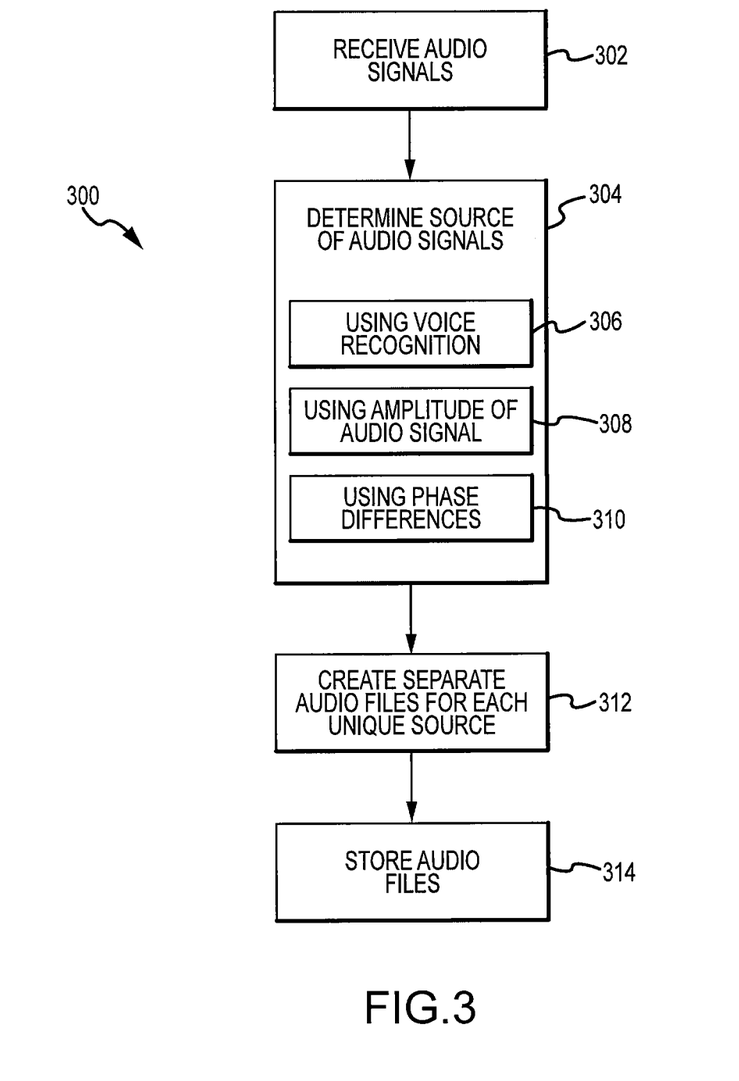
FIG. 3 is a flowchart illustrating an example method for determining sources of audio signals and storing audio files according to the source of the audio signals.

FIG. 3 is a flowchart illustrating a method 300 for processing audio signals, in accordance with an example embodiment. In the method 300, the audio signals are received at one or more audio transducers 102, 104, 106, 108 (Block 302). The computing device 110 then determines the source of the audio signals (Block 304). In some embodiments, voice recognition may be used (Block 306), while in other embodiments, the amplitude of the audio signals (Block 308) or the phase differences between audio signals received at different audio transducers (Block 310) may be used. With respect to the amplitude of the audio signals and the phase differences between audio signals, a comparison between the audio signals received at different audio transducers is performed to triangulate the origin of audio signals. For example, with respect to the amplitude of the audio signals, it may generally be assumed that an audio transducer near the origin of a sound will register a higher amplitude signal than an audio transducer located further away. In some cases, there may be background noise and/or other interference which may be filtered before making the comparison. Similarly, with respect to the phase difference comparison, audio signals received at audio transducers near the origin of the sound will have a phase differential relative the audio signals received at other audio transducers. The phase differences may be used to determine the origin of the sound. In each case, the location of the source relative to the audio transducers may be known so that the sources may be identified by name or title, for example. In some embodiments, more than one technique may be used. In still other embodiments, other techniques may be used.

Optionally, once the source of the audio signals is determined, separate audio files may be created for each unique source (Block 312). The audio files are then associated with their respective audio file and stored in storage 134 (Block 314). Returning to FIG. 2, various audio files are illustrated in the storage 134. Specifically, an Audio 1 file (316), Audio 1A (318), Audio 1B (320), and Audio 1C (322) files are shown. The Audio 1 (316) may represent an entire recording made by one of the sound transducers 102, 104, 106 or 108. Each of the Audio 1A (318), Audio 1B (320), and Audio 1C (322) files may represent a separate audio file created for each unique source in the Audio 1 (316) file. Accordingly, all of the content from each individual source may be accessed by accessing one of the audio files. In some embodiments, the complete recording (e.g., Audio 1 (316)) is not maintained as a complete file but, rather, only the separated files are stored. To aid in the recombination of the separate audio files, a time stamp may be provided at regular intervals to the complete recording and maintained in the separate files.

Figure 4:
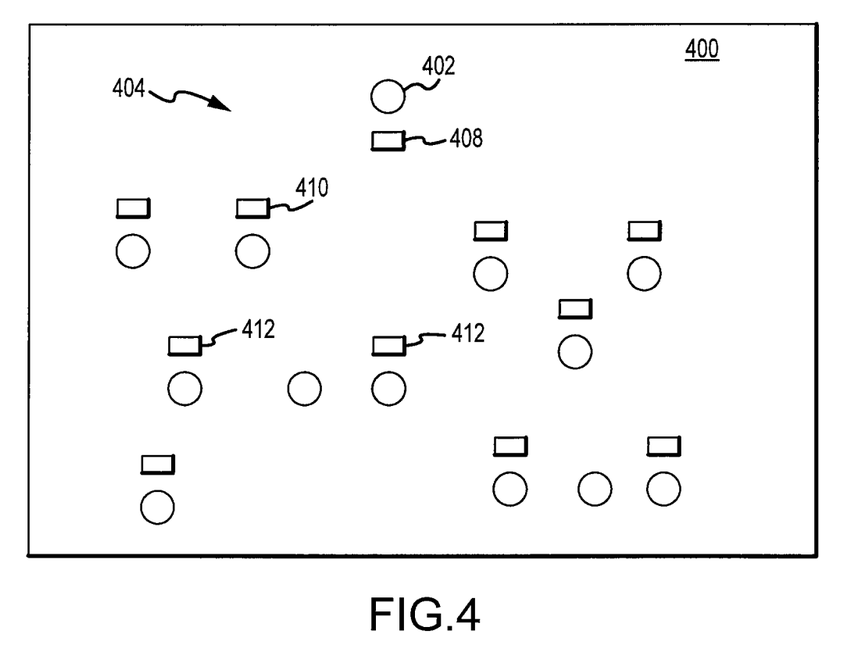
FIG. 4 illustrates a room in which a lecture, discussion or class is taking place with multiple distributed audio recording devices present.
Figure 5:
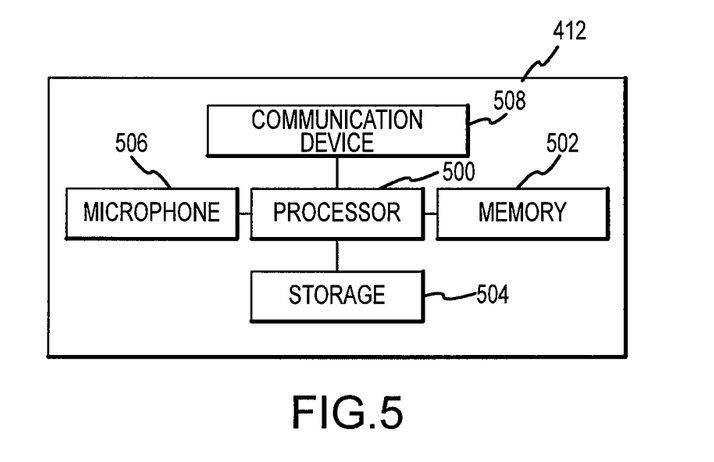
FIG. 5 illustrates an example audio recording device.

Outside of the controlled environment of a teleconference or video conference, a system or method for obtaining an accurate and complete audio track for discussions can incorporate multiple audio recording devices. FIG. 4 illustrates an example environment where multiple audio recording devices may be used in conjunction to generate a complete audio track for a discussion. Specifically, FIG. 4 illustrates a room 400 with an individual 402 facing an audience 404, such as a class for a lecture or a discussion. The individual 402 may have a computing device 406, such as the computing device 110 or transducer 102 (FIG. 1). While members of the audience may also have computing devices 408 similar to computing device 110, others may have devices 412 configured for managing audio recordings in a collaborative manner. As such, the devices 412, in some embodiments, include a processor 500, a memory 502, a storage 504, a microphone 506 and a communication device 508, as shown in FIG. 5. Each of the components in device 412 may be integrated into a single chip, such as a system-on-chip (SOC) or as an application specific integrated circuit (ASIC), for example. In other embodiments, the components may be discretely mounted to a printed circuit board. It should be appreciated that in alternative embodiments, the device 412 may include more or fewer components. Indeed, in some embodiments, the device 412 may be a wireless microphone configured to communicate with computing device 408.

Each device 408, 410, and 412 is configured to record audio signals. In the collaborative environment, each device may share its recording with the other devices. In some embodiments, a master computing device may be established, such as computing device 408, to which all other device transmit recordings for processing. For example, devices 410 and 412 share their respective recordings with computing device 408. In some embodiments, each device is configured to determine source information before providing the audio signals to the master computing device. In some embodiments, the master computing device may determine all source identifying information. Additionally, the master computing device may be configured to combine all of the audio signals into a master recording, and separate and sort the master recording according to the determined source for each portion of the master recording. Moreover, when combining the individual recordings into the master recording, the master device may normalize the amplitudes of each recording so the resulting master recording is a consistent amplitude. The sorted master recording may be provided back to the other devices.

Figure 6:
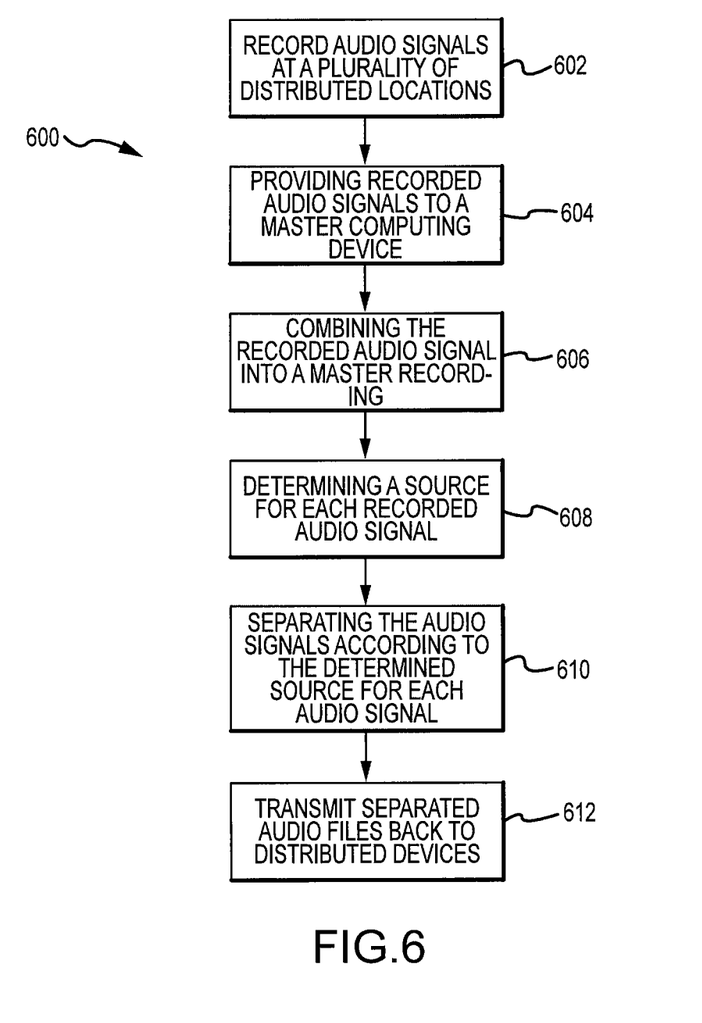
FIG. 6 is a flowchart illustrating an example method for collaborative recording.

FIG. 6 is a flowchart illustrating an example method 600 of operating devices in a collaborative audio recording. As indicated, each of the distributed devices record audio signals (Block 602) and provide the recorded audio signals to a master computing device (Block 604). The distributed devices may be configured to provide recordings to the master computing device continuously, periodically or at the end of recording. In some embodiments, the audio transducers may provide a timestamp to audio signals before providing the audio signals to a master device. The transfer of the recording may be achieved via any wired or wireless manner. In one embodiment, the devices may transfer the recordings to the master computing device via a WiFi network connection. In another embodiment, the recordings may be transferred via a Bluetooth® wireless connection.

The master computing device combines each of the recorded audio signals in a master recording (Block 606) and determines a source for each of the recorded audio signals. (Block 608). The combination of the audio signals into a master recording is described in greater detail below. In some embodiments, the audio signals may be filtered prior to and/or after generating the master recording to remove background noise. Additionally, in some embodiments, the volume of the master recording may be normalized so that segments with low or high volumes are amplified to a desired level relative to other segments for playback The sources may be identified in any of the aforementioned manners including voice recognition, signal amplitude and/or phase differentials, or other such techniques. With the signal amplitude and phase differential additional information, such as the location of participants relative to the audio transducers and/or the location of the audio transducers relative to the master computing device, may be used to triangulate the origin of the audio signals and subsequently determine the source identity of the audio signals.

Once the sources are determined, the audio signals are separated and stored according to the determined source for each audio signal (Block 610). The separation of the audio signals into separate files may be accomplished by dividing the master recording into discrete time segments and correlating each time segment with one or more identified sources, then associating the time segment with the source. In some embodiments, the master recording may be separated at each instance of a different source providing the audio. For example, if a first speaker talks for 30 seconds, followed by a second speaker for 15 seconds before returning to the first speaker for 10 more seconds, the master recording may be separated at the 30 second mark, the 45 second mark and the 55 second mark. The determination as to how long a particular speaker speaks may be determined based on the identification of unique sources and/or origins. Other techniques may also be implemented to separate the master recording.

In some embodiments, the separated audio files are transmitted back to the distributed devices (612). In some embodiments, a file containing the entire master recoding may also be provided to the distributed devices and/or the devices may be configured to compile the separated audio files for playback of the master recording.

The combining of the different recordings may be accomplished in any suitable manner. In some embodiments, a coordinated time stamp may be provided for each recording and the different recordings may be aligned according to the time stamps. For example, the master computing device may transmit a clock or a timer to other recording devices and each device may stamp the recording with the time. Additionally or alternatively, if the devices are communicatively coupled to a network, such as a cellular network or a local area network, a time signal or clock may be received from the network and used. In some embodiments, the timer or time may be transmitted periodically, such as each minute, for example, and each device may provide a minutely timestamp to their recording. In other embodiments, the master device may transmit the time once and every period and the other recording devices maintain the time with an internal clock to provide a continuous timestamp. In yet other embodiments, the master device may provide a continuous time to be stamped on the recordings continuously.

Figure 7:
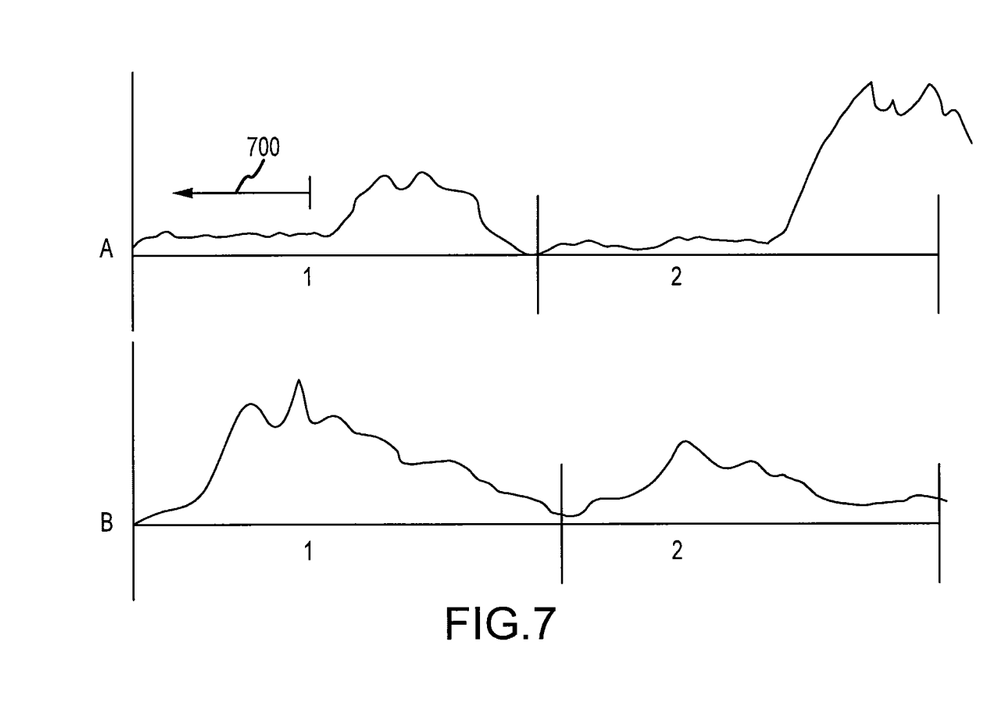
FIG. 7 illustrates a spectral distribution for two recordings.

In other embodiments, spectral components of the recordings maybe compared to determine proper alignment between the recorded signals. FIG. 7. illustrates a sample spectral distribution of two recordings (A and B) over two time periods 1 and 2. The two recordings A and B may be taken by two distributed devices recording in the same space, such as room 400 (FIG. 4). Because the devices are distributed, the magnitude of the audio signals varies between the signals. Additionally, there may be timing differences between the two recordings A and B. To facilitate evaluation and processing of the two recordings A and B, they may be time-shifted so that the time periods 1 and 2 between the two coincide. In some embodiments, the time-shifting may include a spectral distribution analysis to determine spectral coincidence of the recordings. That is, spectral characteristics (e.g., peaks and valleys) may be compared to align the recordings.

In the present example, recording A may be time-shifted as indicated by the arrow 700 to coincide with the time periods of recording B. Depending on the timing scheme used, the time-shifting may be performed once for each recording, on a time period basis, or other suitable basis so that all time periods are aligned. For example, the time shifting may be performed at the beginning of a recording or may be performed iteratively at set time intervals. In some embodiments, the time-shifting may be performed for each change in source.

Figure 8:
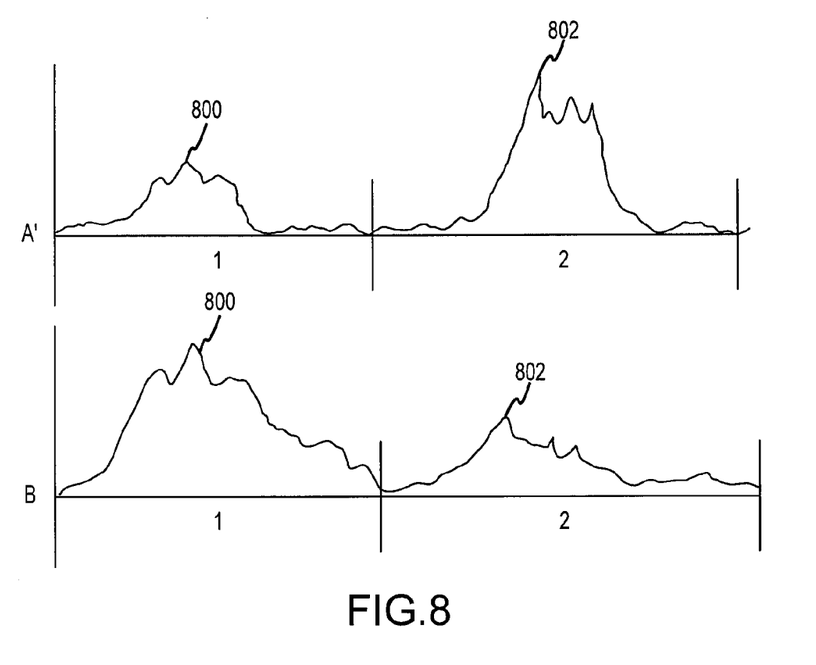
FIG. 8 illustrates the spectral distribution of FIG. 7 after time-shifting.

FIG. 8 illustrates the two recordings A' and B' after alignment. As can be seen, the spectral peaks 800 and 802 between the recordings A' and B generally coincide. However, the amplitudes are different. This may be due to a speaker or other audio source being closer to a particular transducer when speaking (as one example), resulting in the transducer obtaining a audio recording with a higher amplitude signal. For example, referring again to FIG. 4, if the individual 402 speaks during time period 1, the amplitude of the signal recorded by device 408 would be higher than the same audio recorded at devices 412.

A master recording may be created by combining the various recordings from the sound transducers into a single recording. In some embodiments, the spectral comparison of the various recordings may be used to select portions of each recording to be used to create a signal recording, such as the master recording discussed above. For example, for each time segment, the spectral components of each recording are compared and aligned to coincide, as illustrated in FIGS. 7 and 8, to help ensure that the same time segment for each recording is being used. In some embodiments, the recording with the highest amplitude for a given segment and a given source is determined and used for the master recording for that time segment. Generally, the selection of highest amplitude may ensure that the selected recording is from an audio transducer that was closest to the source of the audio signal and, therefore, able to provide the highest quality recording for that time segment.

In some embodiments, an audio signal with the highest fidelity may be used for a master recording rather than the audio signal with the highest amplitude. For example, in some instances a noise level may be particularly high at some audio transducers resulting in a high amplitude signal without attaining a good recording of the discussion. In such instances, an audio signal that does not have the highest amplitude may be used to help ensure that the discussion is recorded rather than noise in the master recording.

In some embodiments, a master recording may be generated that accounts for multiple simultaneous sources. For example, in some embodiments, it may be determined that more than one speaker is speaking during a given time segment. This may be determined based on separate recordings having different spectral characteristics having high amplitude signals. To help reduce the possibility that one of the recordings is simply background noise, a band pass filter may be applied to maintain only the portion of the spectrum that may be generated by a human voice (e.g., approximately 80 Hz to 1100 Hz). If, after filtering, it is determined that more than one speaker is speaking during the time segment, both recordings may be stored. In some embodiments, it may be determined if one of the multiple speakers was speaking in a prior timer segment and, if so, the recording of that source may be maintained in the master recording and other recordings may be provided separately. For example, during playback, an indicator (such as an icon or text box) may be provided indicating another track is available for the time segment. A user may select the indicator to listen to or view the alternate track. In other embodiments, both recordings may be integrated within the master recording to be played simultaneously. Thus, a multi-track recording may be provided. Other embodiments may provide alternative multi-track functionality.

Additionally, in some embodiments, filters may be provided to eliminate sudden loud noises, such as a sneeze or a sound resulting from a dropped object. Generally, a sudden loud noise may be determined to be the highest amplitude audio signal during a time segment and, thus, selected for the master recording. To prevent this scenario, the spectral distribution may be evaluated to see if there was a sudden very large spike. If so, it may be labeled as such and not included in the master recording. In other embodiments, the recording may be filtered with a band pass filter to include only the frequency range of the human voice, as discussed above. In some embodiments, one or more other techniques may be used together to determine that the sudden loud noise should not be included in the master recording.

Moreover, in some embodiments, the redundancy of recording may be used to patch missing parts of an audio signal. For example, a device may have multiple transducers for recording audio signals and may combine the multiple recordings to help ensure that a complete audio recording is provided, for example, to a master recording device. The combination of the audio signals recorded by the device may be implemented using one or more of the foregoing techniques (e.g., selecting a highest amplitude signal for a particular time segment, selecting a highest fidelity signal for a particular time segment, etc.). Additionally, the combination may be targeted to helping ensure that a complete conversation is provided. For example, in some embodiments, a first audio recording may be taken from a first audio transducer and parts where the first audio recording is noisy, weak or otherwise impaired, a second audio recording from a second audio transducer can be used to patch, strengthen or otherwise improve the first audio signal.

Additionally, in some embodiments, when combining the individual recordings into the master recording, each recording may be processed to a position in 3D audio space. For example, in some embodiments, the individual recordings may be processed to generate a stereo effect. In some embodiments, a more complex surround sound effect may be created. Moreover, in some embodiments, a master recording for each source may be created implementing a particular positional effect to create a more realistic reproduction of the event from a listener's perspective. Generally, traditional stereo recordings include a stereo effect. In the present context, using the positional information to generate the stereo effect (or other effect), the stereo effect may be exaggerated for playback making it easier to discern where a particular segment originated.

Although the present disclosure has been described with respect to particular systems and methods, it should be recognized upon reading this disclosure that certain changes or modifications to the embodiments and/or their operations, as described herein, may be made without departing from the spirit or scope of the invention. Indeed, one or more of the techniques described herein may be implemented in whole or in part and may be combined with one or more of the other techniques disclosed herein. Additionally, for example, more information may be provided once a source of audio is identified. For example, a database may include information about various conference participants. The database may store sample audio segments used in voce recognition as well as the additional information about the source. The computing device 110 may have access to the database and upon recognizing a participant based upon either the location of the participant or by voice recognition, the computing device 110 may access the database to make additional information about the participant available. In some embodiments, the additional information may be stored with the audio files. Accordingly, the proper scope of the disclosure is defined by the appended claims and the various embodiments, operations, components, methods and configurations disclosed herein are exemplary rather than limiting in scope.

The invention claimed is:

1. A method of recording audio signals comprising:
    recording audio signals with a plurality of distributed audio transducers to create multiple recordings of the audio signals;
    providing each of the multiple recordings of the audio signals to a computing device, the computing device:
    combining each of the multiple recordings into a master recording;
    determining, from the master recording, a plurality of sources of distinct audio signals in the master recording, each determined source of the plurality of sources comprising a entity that produces sound; and storing, for each of one or more of the determined plurality of sources, a corresponding audio signal in a separate audio file distinct from each of the multiple recordings.

2. The method of claim 1 wherein the operation of combining each of the multiple recordings into a master recording comprises:
aligning spectral distributions of the multiple recordings so that each recording coincides time-wise with the other recordings; and
selecting a highest amplitude signal for each of a plurality of time-steps for use in the master recording.

3. The method of claim 1, further comprising:
obtaining an audio sample from each of a plurality of sources of audio signals; and
comparing each of the multiple recordings with the recorded audio samples to determine the sources of the multiple recordings.

4. The method of claim 1 wherein determining a plurality of sources of distinct audio signals in the master recording comprises:
determining an origin of a respective audio signal relative to the plurality of distributed transducers by comparing at least one of an amplitude and a phase difference between the audio signals received at more than one audio transducer.

5. The method of claim 1, further comprising:
transmitting the recorded audio signals from a plurality of electronic devices to the computing device for creation of the master recording; and
transmitting the master recording to one or more of the electronic devices in the plurality of electronic devices; wherein
the plurality of distributed audio transducers are each part of a distinct electronic device in the plurality of electronic devices.

6. The method of claim 5 wherein transmitting the recorded audio signals comprises transmitting the audio signals via a network connection.

7. The method of claim 5 wherein transmitting the recorded audio signals comprises transmitting the audio signals directly to the computing device via a short range RF transmission.

8. The method of claim 1 further comprising:
transcribing the master recording; and
inserting source information to identify sources in the transcription.

9. The method of claim 5 wherein the multiple audio recordings are transmitted at the end of a recording session.

10. A method of managing audio signals from multiple sources comprising:
electronically receiving a plurality of audio signals from a plurality of electronic devices;
based on at least one characteristic of the plurality of audio signals, electronically determining, from the plurality of audio signals, identities of a plurality of sources of distinct audio signals, each identified source of the plurality of sources comprising a entity that produces sound; and
sorting the plurality of audio signals according to the determined identities; and
storing audio signals corresponding to two or more of the identified sources in separate audio files according to the sorting.

11. The method of claim 10 wherein determining, from the plurality of audio signals, identities of a plurality of sources of distinct audio signals comprises:

comparing each of the plurality of audio signals with at least one sample audio signal to find coincident speech patterns.

12. The method of claim 10 wherein determining, from the plurality of audio signals, identities of a plurality of sources of distinct audio signals comprises:
storing an unidentified recorded audio signal;
labeling the stored unidentified recorded audio signal;
subsequently comparing each of the plurality of audio signals with at least one characteristic of the unidentified recorded audio signal; and
labeling at least one of the plurality of audio signals with the same label as the unidentified recorded signal if a factor of the at least one of the plurality of audio signals patterns matches the characteristic of the unidentified audio signal; wherein the characteristic relates to speech.

13. The method of claim 10, further comprising discretely retrieving the recorded audio signals according to the determined identities.

14. The method of claim 10, further comprising:
retrieving each of the separately stored audio files; and
organizing the separately stored audio files for playback according to a time stamp on the audio files.

15. An audio recording system comprising:
a plurality of distributed sound transducers;
memory;
one or more processors; and
one or more programs stored in memory and configured for execution by the one or more processors, the one or more programs including:
instructions to record audio signals with the plurality of distributed audio transducers to create multiple recordings of the audio signals;
instructions to combine each of the multiple recordings into a master recording;
instructions to determine, from the master recording, a plurality of sources of distinct audio signals in the master recording, each determined source of the plurality of sources comprising a entity that produces sound; and
instructions to store, for each of one or more of the determined plurality of sources, a corresponding audio signal in a separate audio file distinct from each of the multiple recordings.

16. The audio recording system of claim 15 further comprising one or more cameras configured to capture images of the sources for the received audio signals.

17. The audio recording system of claim 16, the one or more programs further including instructions to determine the location of each of one or more respective sources in the plurality of sources of distinct audio signals relative to the plurality of distributed sound transducers; and
wherein the one or more cameras are configured to move to be directed towards at least one of the one or more determined locations.

18. The audio recording system of claim 15 further comprising at least one antenna, the antenna being configured to receive audio signals transmitted from the plurality of distributed sound transducers.

19. The audio recording system of claim 15, wherein the instructions to determine, from the master recording, a plurality of sources of distinct audio signals in the master recording include instructions to execute voice recognition software.

20. The audio recording system of claim 15 further comprising a speaker for playback of the audio signals, wherein the stored audio signals are retrieved and combined for playback according to a time stamp associated with the stored audio signals.

\* \* \* \* \*